United States Patent
Willins et al.

(10) Patent No.: US 7,680,085 B2
(45) Date of Patent: Mar. 16, 2010

(54) OUT-OF-BAND MANAGEMENT AND TRAFFIC MONITORING FOR WIRELESS ACCESS POINTS

(75) Inventors: Bruce A. Willins, East Northport, NY (US); Richard M. Vollkommer, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1832 days.

(21) Appl. No.: 09/911,670

(22) Filed: Jul. 24, 2001

(65) Prior Publication Data

US 2003/0021250 A1    Jan. 30, 2003

(51) Int. Cl.
*H04W 4/00* (2009.01)
(52) U.S. Cl. .................. 370/338; 370/244; 370/245; 370/465; 370/466
(58) Field of Classification Search .............. 370/252, 370/254, 310, 328, 338, 400, 401, 244, 245, 370/465, 466; 455/67.11, 410, 456.5, 550.1
See application file for complete search history.

(56) References Cited

U.S. PATENT DOCUMENTS

| | | | | |
|---|---|---|---|---|
| 5,233,643 | A * | 8/1993 | Naeini et al. ............. | 455/456.1 |
| 5,546,397 | A | 8/1996 | Mahany | |
| 5,996,028 | A * | 11/1999 | Niimi et al. ................. | 710/13 |
| 6,326,926 | B1 * | 12/2001 | Shoobridge et al. ......... | 343/702 |
| 6,452,910 | B1 * | 9/2002 | Vij et al. .................... | 370/310 |
| 6,633,979 | B1 * | 10/2003 | Smeets ....................... | 713/151 |
| 6,731,908 | B2 * | 5/2004 | Berliner et al. ........... | 455/67.11 |
| 6,816,731 | B1 * | 11/2004 | Maruyama ................. | 455/441 |
| 6,965,942 | B1 * | 11/2005 | Young et al. ............... | 709/232 |
| 7,114,010 | B2 * | 9/2006 | Karaoguz et al. ........... | 709/250 |

FOREIGN PATENT DOCUMENTS

| | | |
|---|---|---|
| EP | 1113644 | 7/2001 |
| JP | 1093696 | 4/1998 |
| WO | WO 0068824 | 11/2000 |
| WO | WO 01/39538 | 5/2001 |
| WO | WO 01/63825 | 8/2001 |
| WO | 0221778 A1 | 3/2002 |
| WO | WO 02/21778 | 3/2002 |

OTHER PUBLICATIONS

Office Action in related China patent application 02127112.7 dated Apr. 1, 2005.
Office Action in related China patent application 02127112.7 dated Dec. 28, 2007.

(Continued)

*Primary Examiner*—William Trost, IV
*Assistant Examiner*—Toan D Nguyen

(57) ABSTRACT

In a wireless data communications system a method is provided for conducting out-of-band for management and other communications with access points. The system operates under a first protocol, such as IEEE 802.11 protocol to provide wireless data communications. The access points are provided with a second radio module for conducting wireless data communications using a second protocol, such as Bluetooth. A wireless terminal, operating as a Bluetooth master can access the processor in the access point to conduct management and other communications relating to the operation of the access point.

20 Claims, 1 Drawing Sheet

OTHER PUBLICATIONS

Office Action in related China patent application 02127112.7 dated May 9, 2008.

Office Action in related China patent application 02127112.7 dated Sep. 5, 2008.

Laid Open Japan Patent Application Hei 10-93696 dated Apr. 10, 1998 Nippon Electric Mobile Communication Co., Ltd.

Office Action in related Japan patent application 2002-210497 dated Sep. 3, 2007.

Office Action in related Japan patent application 2002-210497 dated Dec. 20, 2007.

Laid Open Japan Patent Application Hei 10-93696 dated Apr. 10, 1998 Nippon Electric Mobile Communication Co., Ltd. Japanese with English translation.

* cited by examiner

OUT-OF-BAND MANAGEMENT AND TRAFFIC MONITORING FOR WIRELESS ACCESS POINTS

BACKGROUND OF THE INVENTION

The current invention relates to access points in a wireless local area network, such as access points in an IEEE Standard 802.11 wireless local area network. In particular the current invention relates to providing "out-of-band" management and monitoring of access points in a wireless local area network.

It is an object of the present invention to provide a method and apparatus for providing out-of-band management and monitoring communications with access points used in connection with a wireless local area network.

SUMMARY OF THE INVENTION

In accordance with the invention there is provided a method for use in a system for providing wireless data communications using a first protocol, where the system has access points for conducting wireless data communications with mobile units using the first protocol. According to the invention there is provided a method for conducting out of band management communications with an access point which includes providing the access point with a radio module operating according to a second wireless data communications protocol and conducting management communications with the access point using the second wireless data communications protocol.

In one embodiment of the invention the first protocol is an 802.11 protocol. The second data communications protocol may be a Bluetooth protocol. The management communications may be conducted by causing the radio module associated with the access point to become associated as a slave unit with a master unit operating under the second wireless data communications protocol.

In accordance with the present invention there is provided an access point for use in a wireless data communications system. The access point includes a first interface for conducting data communications with one or more computers. A first radio module using a first protocol is provided for sending wireless data messages received at the first interface and for receiving and relaying data messages via the first interface. At least one processor is provided for controlling the access point wherein the processor has a second interface. A second radio module using a second wireless data communications protocol for wireless data communications different than the first protocol is provided for providing wireless data communications with the processor via the second interface.

In one embodiment the second radio module is arranged to operate as a slave module using a master/slave protocol, which may be the Bluetooth protocol.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
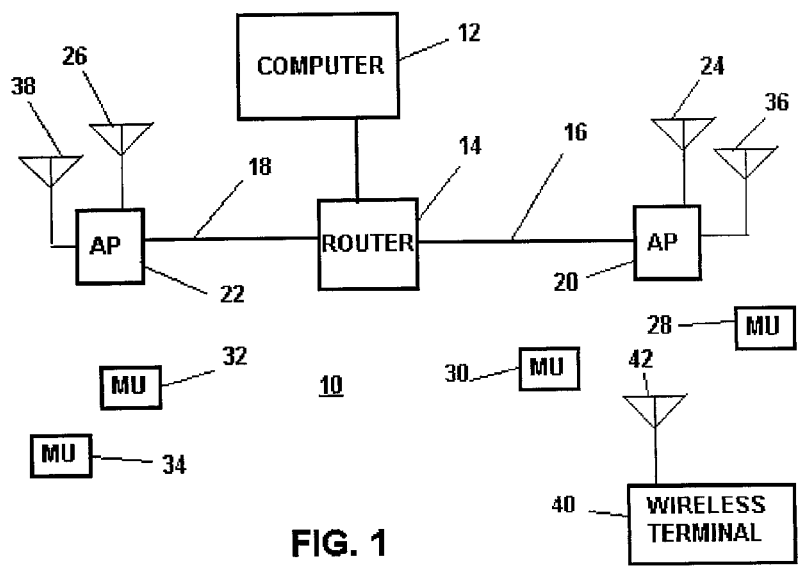
FIG. 1, is a block diagram showing a wireless local area network in which the method of the present invention may be practiced and including access points according to the present invention.

Referring to FIG. 1 there is illustrated a block diagram of a wireless local area network system in which the method of the invention may be practiced. The wireless local area network 10 includes a host computer 12 which is connected by a router or switching circuit 14 to access points 20 and 22 over internet communications cables 16 and 18. Those skilled in the art will recognize that in a typical system, such as a system following the IEEE standard 802.11 protocol, there may be multiple computers connected to a wired internet system by routers 14 and there may be many access points distributed over a facility, such as a university campus, a hospital, or an industrial establishment. Each of the access points 20 and 22 provides communications with mobile units 28, 30, 32 and 34 that are in the vicinity of the respective access points. Communications is by a wireless local area network protocol, such as standard 802.11, wherein a mobile units become associated with and communicates with the network over access points to provide a wireless data communications with computer 12 and other elements of the system. One example of a wireless system is the Spectrum 24 system which is available from Symbol Technologies, assignee of the present application.

According to the 802.11 protocol, mobile units 28 and 30, which are in proximity to access point 20 communicate with the radio module of access point 20, indicated by antenna symbol 24. The selection of access point 20 for communications by mobile units 28 and 30 is in accordance with the signal strength of the beacons provided by the access, points and accordingly the mobile units ideally become associated with the access points in the closest proximity, or having the best conditions for mobile communications. It should be recognized, however, in some circumstances mobile units may be directed to communicate with other access points, for example to control traffic in a system. Likewise mobile units 32 and 34 may be associated with access point 22 through its RF module for the 802.11 system, represented by antenna symbol 26.

In systems of the type shown in FIG. 1 and described thus far, it is common practice to provide management communications with access points 20 and 22 through the internet system, such as from computer 12 via router 14 and internet cable 16, 18 to access points 20 and 22. Such management communications may provide updated system information, modified system programming, information concerning association with mobile units and other appropriate data or software for use by access points 20 and 22. In addition computer 12 may communicate with access points 20, 22 to read out data accumulated by access points 20, 22, for example, with respect to the traffic load that they are handling for purposes of communications and system management.

In some cases, the ability of computer 12 to successfully access the management communications functions of access points 20 and 22 may not be successful. One reason may be an error in the configuration of the access point 20, 22 for data communications on internet cable 16. Another reason may be an error in the currently stored software for access point 20 or 22. When this communication failure occurs, a process called "in-band management communication failure," it becomes necessary to communicate with the access point 20, 22 via another means in order to correct the failure.

One way in which out of band communication with remote access points which has been conducted in the past is by providing a portable system, such as a computer, which is provided with management software, and which can be physically connected, by a data communications cable to a port on access points 20 or 22. The problem with this prior art approach is that the access points 20 or 22 may be located in difficult to reach locations, such as mounted on or within the ceiling of a facility, so that they are not subject to tampering. In this event, it becomes necessary for a service technician to obtain and climb a ladder, locate the access point and make a physical connection therewith.

Figure 2:
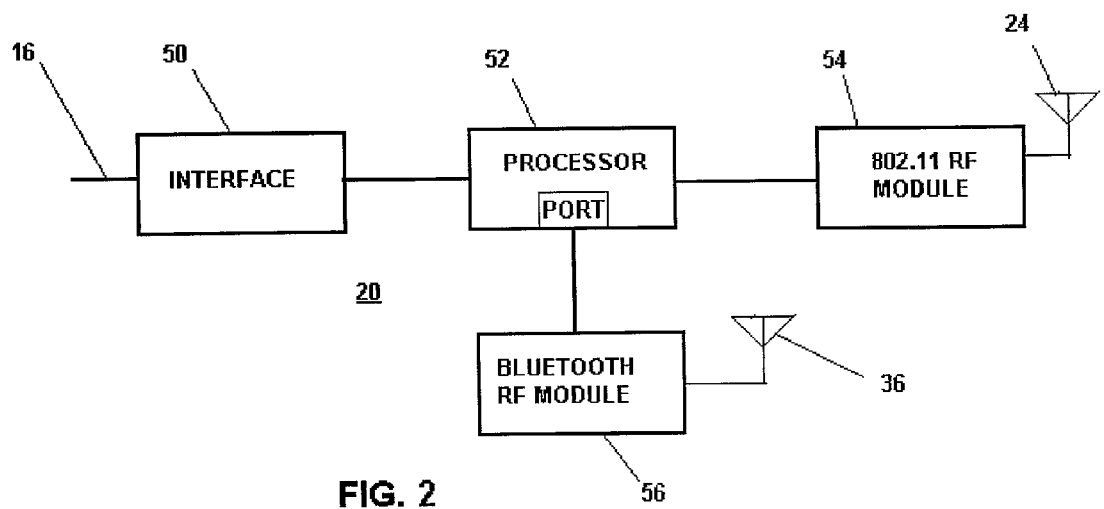
FIG. 2, is a block diagram illustrating one configuration of access points in accordance with the present invention.

The block diagram of FIG. 1 shows an improved method and system whereby out of band management and monitoring communications can be conducted with access points 20, 22 using an alternate data communication protocol which is provided between a second radio module in access points 20, 22, represented in FIG. 1 by second antennas 36, 38 and a wireless terminal 40 having a communications module, represented by antenna symbol 42. Wireless terminal 40 communicates with access points 20 or 22 via their second radio module preferably using a wireless data communications protocol that is different than the data communications protocol used in the wireless local area network 10. For example if the wireless local area network 10 is communicating with mobile units 28, 30, 32 and 34 using the data communications protocol of IEEE 802.11, wireless terminal 40 may communicate with access points 20, 22 for monitoring and management functions using a second wireless data communications protocol such as a master-slave data communications protocol, which may be Bluetooth. FIG. 2 is block diagram of one embodiment of an access point having a second radio module according to the present invention.

In FIG. 2 there is shown a block diagram of an access point 20 which includes a network interface 50, a processor 52, which may be a microprocessor or a digital signal processor, and which provides an interface for providing data messages, such as 802.11 data packets from network interface 50 to RF module 54, operating under 802.11 protocol. Processor 52 may provide, in addition to the interface functions, certain 802.11 higher level MAC processing. In addition to interface 50, processor 54 and radio 52, which are found in conventional access points, there is provided a second radio module 56 which is connected to a port of processor 52, for providing RF data communications using a master/slave protocol, such as Bluetooth. In an exemplary embodiment, RF module 56 operates as slave unit under the Bluetooth protocol, and when accessed and commanded by wireless terminal 40, which has a Bluetooth master RF module, becomes associated with the master RF module of terminal 40, and acts as a slave unit to provide management communications between processor 52 and wireless management module terminal 40. In addition terminal 40 may be used to access data relating to the traffic being handled by access point 20 as recorded or determined in processor 52.

Security features are preferably provided for the communication between wireless terminal 40 and access point 20. Security features can provide mutual authentication of the wireless terminal 40 and the access point 20 to assure that the wireless terminal is authorized to conduct management communications with the access point. In addition, authentication can provide assurance that the communication is with the intended access point.

In addition, message encryption can be used to assure that the data communications are authentic and maintained confidential.

Security features may be limited to communications using RF module 56, since the operation of the wired interface 50 and RF module 54 may not be available in situations when out-of-band management functions are required. Accordingly, the security features must be carried out entirely within access point 20.

One method to provide security is to provide a pre-shared secret, which is dedicated to communications with the out-of-band management module 56. Alternately the same shared secret can be used for authentication between the access point and a network authentication server. The shared secret is preferably stored in some form of secure storage, either embedded in the access point 20 or in a removable token, such as a "smart card".

One possible arrangement is KERBEROS based security, which uses electronic "tickets" to initiate access. The wireless terminal 40 can request and obtain a KERBEROS ticket to authorize access to the out-of-band management RF module 56 of an access point 20. In addition, or alternatively, a universal ticket allowing out-of-band access to all ports may be provided.

While there have been described what are believed to be the preferred embodiments of the present invention, those skilled in the art will recognize that other and further changes and modifications may be made thereto without departing from the spirit of the invention and it is intended to claim all such changes and modifications as for within the true scope of the invention.

The invention claimed is:

1. In a system for providing wireless data communication with mobile units using a first wireless communications protocol, said system having an access point, a host computer adapted to provide management communications with the access point, and the mobile units, a method performed by the access point for conducting communications, the method comprising the steps of:
   conducting wireless data communications with the mobile units using said first wireless communications protocol;
   receiving, by a network interface of the access point, the management communications from the host computer over a cable connection; and
   when a communication failure between the host computer and the access point occurs over the cable connection, a radio module of the access point receiving the management communications from a wireless terminal that is distinct from the host computer over a wireless connection using a second wireless communications protocol to allow management of the access point, wherein the second wireless communication protocol is different from the first wireless communication protocol.

2. The method according to claim 1 further comprising at least one of configuring one or more resources of said access point and adjusting one or more parameters of said access point responsive to said received management communications.

3. The method according to claim 1 wherein the first wireless communications protocol is an 802.11 Protocol and the second wireless communications protocol is Bluetooth.

4. The method according to claim 3, further comprising authenticating said management communications.

5. The method according to claim 4 further comprising associating said radio module as a slave unit.

6. The method according to claim 1 wherein said second wireless communications protocol is Bluetooth.

7. The method according to claim 1, further comprising authenticating said management communications.

8. The method according to claim 1, wherein receiving the management communications comprises receiving one or more communications selected from a group of communications that includes updated system information, modified system programming, information concerning association with the mobile units, data for use by access points, and software for use by access points.

9. The method according to claim 1, further comprising monitoring the wireless data communication using the second wireless communications protocol.

10. An access point for use in a wireless data communication system, comprising:
a first network interface for conducting data communications with one or more computers adapted to provide management communications with the access point, and for receiving the management communications from the one or more computers over a cable connection;
a first radio module using a first wireless communications protocol for wirelessly transmitting first data messages received from the one or more computers at said first network interface to mobile units, and for receiving second data messages from the mobile units and relaying the second data messages to the one or more computers via the first network interface;
at least one processor connected to the first network interface and the radio module for controlling the access point; and
a second radio module operating using a second wireless communications protocol, which is different from the first wireless communications protocol, and for receiving the management communications from a wireless terminal that is distinct from the host computer over a wireless connection when a communication failure between the one or more computers and the access point occurs over the cable connection.

11. The access point as specified in claim 10, wherein said second radio module is arranged to operate as a slave module using a master slave protocol.

12. The access point as specified in claim 10, wherein the second radio module is arranged to operate as a slave module using a Bluetooth protocol.

13. The access point as specified in claim 10 wherein said processor is further arranged to authenticate communications via said second radio module.

14. The access point as specified in claim 10, wherein the at least one processor further allows monitoring the data communications using the second wireless communications protocol.

15. An apparatus, comprising:
a hardwired network interface;
a first radio module adapted to provide data communications with mobile units according to a first wireless communications protocol;
a second radio module adapted to communicate with a wireless terminal according to a second wireless communications protocol, which is different from the first wireless communications protocol; and
a processor communicatively coupled to the hardwired network interface, the first radio module, and the second radio module, the processor adapted to
provide data messages from the hardwired network interface to the first radio module,
receive, via the hardwired network interface, management communications from a remote computer that is distinct from the wireless terminal and that is adapted to provide the management communications to the apparatus, and
when a communication failure between the remote computer and the apparatus occurs over the hardwired network interface, to receive the management communications using the second wireless communications protocol from the wireless terminal via the second radio module.

16. The apparatus of claim 15, wherein the processor is adapted to allow data communications through the first radio module and to allow access to management features through the second radio module.

17. The apparatus of claim 16, wherein the second radio module operates as a slave unit at least during a portion of the time the access to the management features is allowed.

18. The apparatus of claim 15, wherein the processor is further adapted to authenticate communications associated with access of management features.

19. The apparatus of claim 15, wherein the first wireless communications protocol is an 802.11 protocol and the second wireless communications protocol is a Bluetooth protocol.

20. The apparatus of claim 15, wherein the processor is further adapted to allow monitoring of the data communications.

* * * * *